March 2, 1954  E. B. VANDAS ET AL  2,670,787
CHAIR OF MALLEABLE MATERIAL
Filed July 13, 1948  3 Sheets-Sheet 1
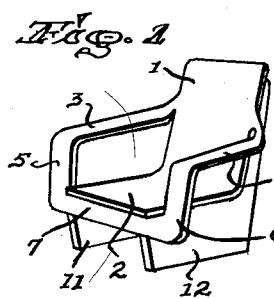
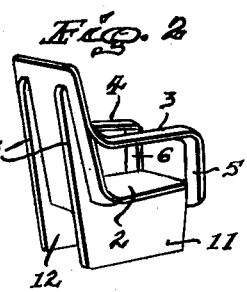
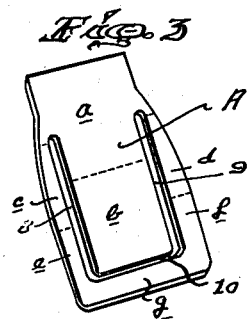
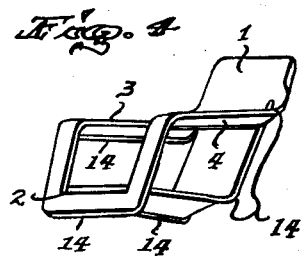
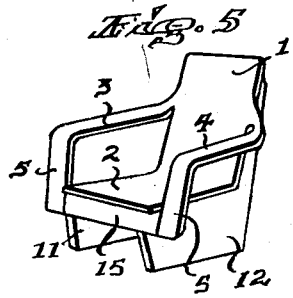
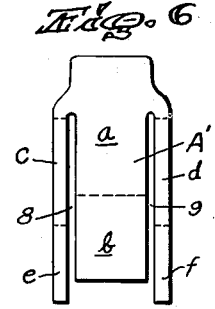
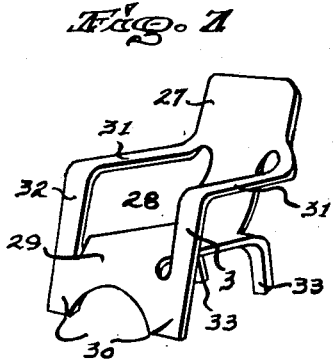
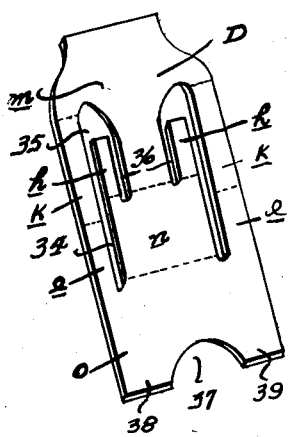
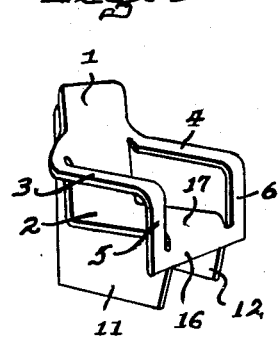
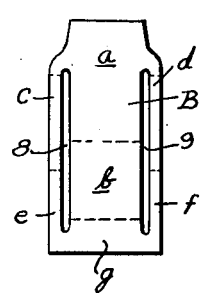
INVENTORS.
EDWARD B. VANDAS
EDWARD M. FISCHER
BY
Pattison, Wright & Pattison
ATTORNEYS

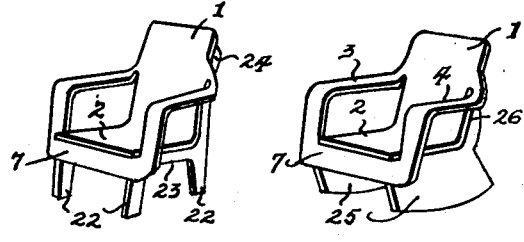
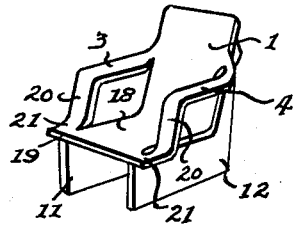
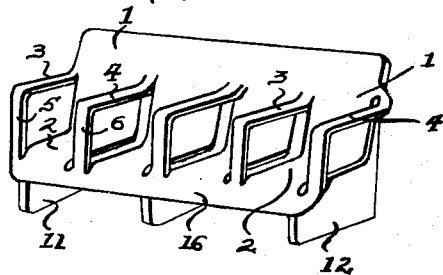
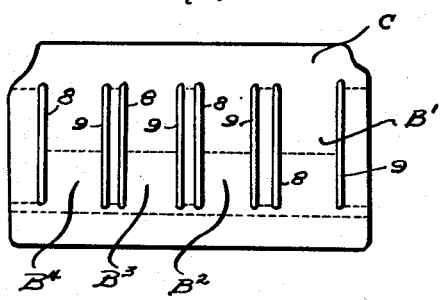
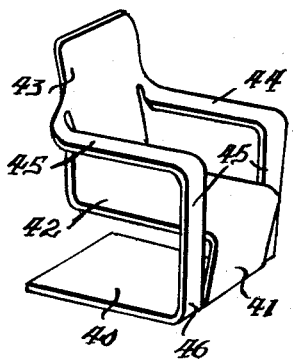
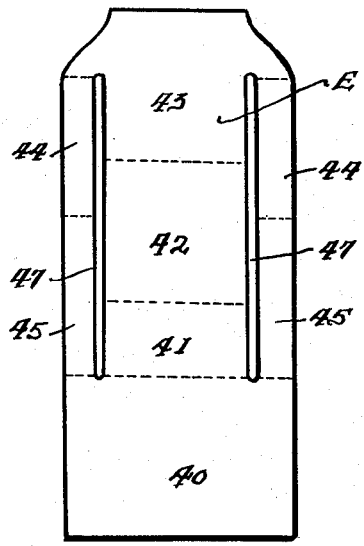

Patented Mar. 2, 1954

2,670,787

UNITED STATES PATENT OFFICE 2,670,787

CHAIR OF MALLEABLE MATERIAL

Edward B. Vandas and Edward M. Fischer, St. Louis, Mo.

Application July 13, 1948, Serial No. 38,378

1 Claim. (Cl. 155—193)

This invention relates to chairs and the method of producing them and is directed to chairs commonly referred to as the occasional type but the chairs are suitable for wide and varied usage, for instance, as lounge chairs, porch chairs and outdoor chairs commonly used on lawns.

An object of the invention is the provision of chairs of extremely simple construction and composed of a minimum number of parts with the major portion or parts of the chairs being formed in one piece whereby the chairs are simple and economical of manufacture and therefore cheap of production.

Another object of the invention is the provision of chairs constructed in a manner whereby they can be shipped in a largely knock-down condition with the chair bottoms, backs, and arms of each chair telescoping and snugly fitting into or atop of an adjacent chair thus enabling a plurality of chairs to be shipped in a minimum of space.

Another object of the invention is the provision of a novel method of manufacturing the chairs which method includes production of a single chair or a plurality of interconnected chairs in accordance with the dictates of desire.

A still further object of the invention is the provision of chairs in which the chair back, seat, arms, and arm supports are made of one single and continuous piece of material.

Another and still further object of the invention is the provision of chairs the construction of which makes it possible to form the chairs of different materials in accordance with the particular desire or the particular use to which the chairs are to be put as for instance plastic, metal, wood, or laminated material.

Other objects and advantages derived from the invention will appear from the following description when read in the light of the accompanying drawings as will also appear the novel features of the chairs and the method of producing them all of which will be immediately discernible to those familiar with and skilled in the art.

The inventive concept can with slight modifications be utilized in the production of chairs having specifically different construction and appearance yet all embodying the broad principle of the invention and accordingly in the following drawings there is illustrated a plurality of chairs.

In the drawings:

Fig. 1 is a perspective view illustrating the side and front of a chair.

Fig. 2 is a perspective view illustrating a side and back of the chair of Fig. 1.

Fig. 3 is a plan view of a blank from which is formed the seat, back and arms of the chair of Figs. 1 and 2.

Fig. 4 is a perspective view of a chair of slightly modified construction over the chair appearing in Fig. 1 of the drawings.

Fig. 5 is a perspective view of another modified form of the invention and illustrates a chair similar to but slightly different from the chair appearing in Fig. 1.

Fig. 6 is a plan view of a blank for the formation of the seat, back and arms of the chair of Fig. 5.

Fig. 7 is a perspective view of a still further form of chair.

Fig. 8 is a plan view of a blank for the formation of the complete chair of Fig. 7.

Fig. 9 is a perspective view of a chair having similarity to but being different from the specific details of the chair of Fig. 1.

Fig. 10 is a plan view of a blank for the formation of the back, seat and arms of the chair of Fig. 9.

Fig. 11 is a perspective view of a modification of the chair of Fig. 1 in that the supporting legs therefor are different.

Fig. 12 is a perspective view of a still further modification of the chair of Fig. 1 differing therefrom in the chair leg arrangement.

Fig. 13 is a perspective view of a chair basically similar to but slightly different from the chair of Fig. 1.

Fig. 14 is a perspective view of a unit made up of a plurality of chairs of the construction of the chair of Fig. 9.

Fig. 15 is a plan view of a blank for the formation of the chair seats, backs and arms of the unit chair of Fig. 14.

Fig. 16 is a perspective view of a still further modified form of chair which is made in its entirety of one piece.

Fig. 17 is a plan view of a blank from which the chair of Fig. 16 is formed.

Figure 18:
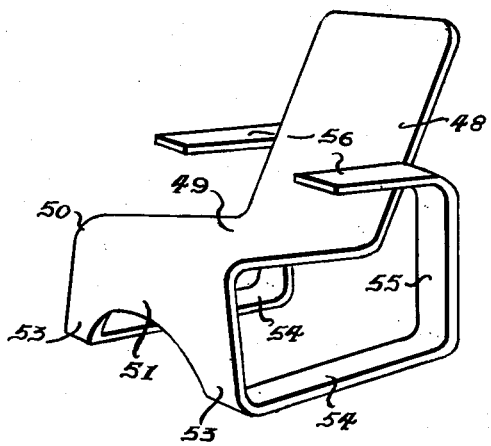
Fig. 18 is a perspective view of a still further modified form of chair made in its entirety from one piece of material.

It is primarily contemplated that the chairs will be made of plywood but the invention is not to be limited to the use of this particular material as the chairs can be formed from any suitable pliable material such as metal, plastic or wood and the wood can be of a single piece or be of laminated form. The invention is not limited to the particular thickness of the particular material utilized although under some conditions it might be found desirable to use a comparatively light gage sheet metal. Sheet metal would be particularly desirable in the formation of those chairs having a return bent edge as for instance the chair of Fig. 4. However in respect to the provision of a return bent edge this construction could be utilized in respect to any of the chairs if it is found to be desirable or advantageous.

The following description the chairs will be referred to as being composed of a material or of a sheet and it is to be understood that this material or sheet is malleable by which is meant that the material can be formed or bent into the desired shape or configuration but has sufficient inherent rigidity to remain in the shape or form into which it is bent or pressed, or molded.

The chair of Fig. 1 is formed from the sheet A of Fig. 3. The chair comprises a back 1, a seat 2, side arms 3 and 4 having at their forward ends arm supports 5 and 6 the lower ends of which are interconnected by a cross piece or bar 7. The chair parts thus far described as composed of a single piece of material and by reference to Fig. 3 it will be seen that the blank portion $a$ forms the chair back; the portion $b$ the seat; the parts $c$ and $d$ the arms; the parts $e$ and $f$ the arm supports; and the part $g$ the cross bar or member 7. The blank is bent or otherwise deformed on the dotted lines appearing in Fig. 3 to shape the chair parts and additionally the blank adjacent its longitudinal edges is provided with elongated cut-outs 8 and 9 joined at their forward ends by a cut-out 10.

Like all of the chairs the present chair is provided with supporting means which in this particular instance are in the form of a pair of legs 11 and 12. These legs, and similarly the legs of certain of the other chairs hereinafter described, can be secured in place in different ways in accord with that best suited. In sheet metal construction the legs can be riveted, bolted or spot welded to the chair seat and back whereas in plain or ply wood construction the legs would be secured by screws or nails, preferably countersunk, or by dowel pins. A similar method of securing the legs would probably be used when the chair is thermo-plastic, in nature. There are suitable adhesives which could be used to secure the legs in place with sufficient rigidity.

Specifically the legs 11 and 12 extend substantially throughout the length of the chair seat and at their rear ends have upwardly extending uprights 13 abutting and suitably secured to the rear face of the chair back.

The chair of Fig. 4 is identical to that of Fig. 1 with the exception that the edges of the chair are provided with a return bend so that the outer edges of the back, seat, arms, arm supports, and cross member have an in or down turned edge 14. No blank is illustrated for the formation of the chair of Fig. 4 as the blank therefor would be identical to the blank of Fig. 3 except that its over-all dimensions would be slightly greater to provide for the return bend edge.

The chair of Fig. 5 is identical to the chair of Fig. 1 with one exception. The cross member or bar interconnecting the lower ends of the arm rests 5 is made as a separate element 15 and is suitably secured in place. The blank for producing chair 5 appears in Fig. 6 and differs from the blank of Fig. 3 only in the elimination of the portion or part $g$ thereof and accordingly the blank carries the same designations appearing on the blank of Fig. 3 with the blank as an entirety being given identifying designation $A^1$. This chair if desired can be provided with a return bend edge.

The chair of Fig. 9 is a slight modification of the chair of Fig. 1 and is identical to that chair with the exception that the front end of the chair seat 2 is formed to extend downwardly and merge into the cross bar or member 16 as indicated at 17. This chair is formed from the blank B illustrated in Fig. 10 which blank is identical to the blank of Fig. 3 with the exception that the cut-out 10 of blank A has been eliminated. The parts of blank B carry the same identifying designations as those of blank A.

The chair of Fig. 13 is a further slight modification of the chairs thus far described and differs from them only in the elimination of any cross bar or element below the chair seat at its front end. In this chair the seat 18 has its forward end 19 terminating as does the seats 2 and 15 of the chairs of Figs. 1 and 5 but the arm supports 20 merge into the forward end of the seat as designated at 21 rather than extending downwardly for interconnection by a cross bar as is the case in respect to the chairs previously described. The blank for the formation of chair 13 is not illustrated as the slight modification of blank A to form this chair is so obvious as to make illustration of it unnecessary. This chair is illustrated as being provided with the same type of legs as the chairs of Figs. 1, 5 and 9.

Changes in the exact type of chair leg can obviously be made without departing from the inventive concept and illustrations of such changes appear in Figs. 11 and 12 wherein the chair of Fig. 1 is selected for illustration. In Fig. 11 individual legs 22 are provided for the four corners of the chair seat. These legs are interconnected at their upper ends by a bar or stringer 23 disposed beneath the longitudinal edges of the seat bottom. The legs at each rear end of the chair are provided with an upwardly extending arm 24, similar to the uprights 13 of the legs of the chair of Fig. 1, which abut and are secured to the rear face of the chair back.

If desired the chair can be made in the form of a rocker and this is illustrated in Fig. 12 wherein the chair legs 25 are in the form of rockers the rear ends of which are provided with uprights 26 secured to the rear face of the chair back 1.

Thus far single chairs and the method of making them have been described but any of the chairs thus far described, and as a matter of fact all of the chairs to be described, can be made in multiple units from a single blank or sheet. Such a construction is illustrated in Fig. 14 wherein the chair of Fig. 9 is selected for illustration. In this instance a four-unit chair is selected for illustration and provides what is in effect a bench. Comparison of this bench with the chair of Fig. 9 will give a complete understanding of the construction and the blank for making the chair is illustrated in Fig. 15 and comprises no more than a plurality of blanks B. This blank, designated C and being made up of a plurality of blanks B these are designated as $B^1$, $B^2$, $B^3$ and $B^4$. There are of course a plurality of cut-outs 8 and 9 and the blank is bent or formed on the dotted lines in the formation of the bench.

To the end of reducing to the minimum the chair parts chairs are illustrated in which the chair legs are an integral part of the blank with the result that the chairs are formed in their entirety from a single piece or sheet of material.

One such chair is illustrated in Fig. 7 of the drawings and the blank D for the formation of the chair is illustrated in Fig. 8. This chair comprises a back 27, a seat 28 having its forward or outer end extending downwardly as at 29 and terminating in a pair of front legs 30. The chair arms 31 are supported at their rear ends from the back and at their forward ends by downwardly extending arm supports 32 the lower ends of which merge into and form the chair front legs 30. At its rear end the seat at each of its corners extends downwardly to form rear legs 33. The blank from which this chair is formed has at each of its sides identical cut-out portions each of which adjacent the blank edge has a long cut-out portion 34 the rear end of which is enlarged as at 35 and from which extends a shorter cut-out portion 36 which throughout its length parallels the long cut-out portion 34. These cut-outs provide the blank portions $h$ which form the rear legs of the chair and also the portions $k$ and $l$ which form respectively the arms and their forward end supports 32. The back is formed from the blank portion $m$; the seat from the portion $n$; and the front legs from the portion $o$ which is cut out as at 37 to provide individual feet 38 and 39 for the front chair legs. The blank is formed or bent on the dotted lines appearing in Fig. 8.

Fig. 16 illustrates another chair made in its entirety from a single blank and in this instance the chair is supported upon a one-piece base 40 which is in the form of a sizeable flat plate which is a rearward extension of the vertically disposed front end 41 of the chair seat 42. The chair back 43 supports the rear ends of the chair arms 44 and the supports 45 for the front ends of the arms have their lower ends connected as at 46 to the front corners of the base or plate 40. The blank E for the formation of this chair is illustrated in Fig. 17 and the manner of bending or forming the blank is illustrated in dotted lines. The chair arms and their forward supports can be formed from the blank due to the cut-outs 47 provided in the blank along its longitudinal edges. The chair parts which the blank forms are indicated in Fig. 17 by the same numerals appearing in Fig. 16.

Figure 19:
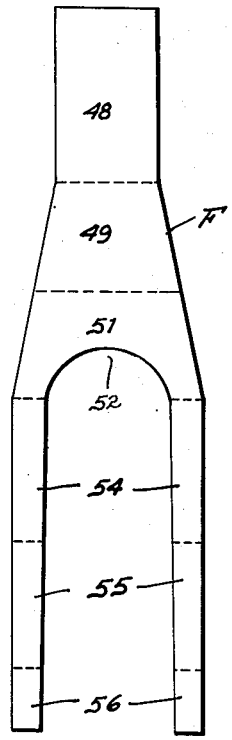
Fig. 19 is a plan view of a blank from which the chair of Fig. 18 is formed.

Another chair composed in its entirety of one piece is illustrated in Fig. 18 and the blank for the formation thereof in Fig. 19. The chair back 48 is inclined slightly rearwardly and has its lower end merging into the chair seat 49 the front end of which is rounded as at 50 and extends downwardly to form the front plate 51 cut out as at 52 to provide individual front legs 53 each of which has a rearwardly extending runner or base 54 extending throughout the length of the chair seat. The rear ends of these runners have upwardly extending arm supports 55 from the upper ends of which are the forwardly extending chair arms 56 one of which parallels each side of the chair seat at the proper height thereabove to give comfortable arm support. The blank F of Fig. 19 for the formation of this chair carries dotted lines illustrating the points at which the blank is formed or bent to provide the chair of Fig. 18. The blank carries the same designating numerals as the chair in Fig. 18 for designating like chair parts.

Figure 20:
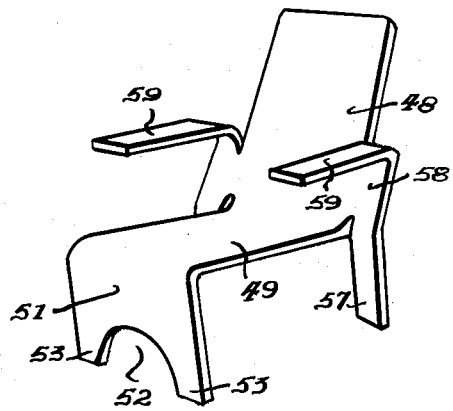
Fig. 20 is a perspective view of another and still further modified form of chair made in its entirety from a single piece of material.
Figure 21:
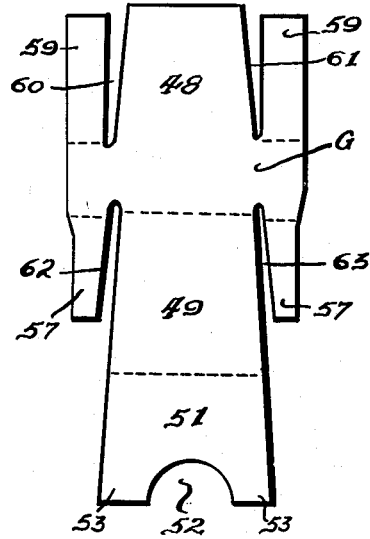
Fig. 21 is a plan view of a blank for the formation of the chair of Fig. 20.

A slight modification of the chair of Fig. 18 is illustrated in Fig. 20 and the blank for the formation of this chair appears in Fig. 21. This chair differs from the chair of Fig. 18 in the elimination of the bases or runners 54. There is the same chair back 48, seat 49, seat front plate 51 provided with the cut-out 52 for the formation of the front legs 53. The rear legs 57 have their upper ends 58 paralleling and in the same plane with the chair back and have forwardly extending arm rests 59. Referring to the blank G from which this chair is formed and appearing in Fig. 21 the illustration carries dotted lines at the points of formation or bend of the blank in the production of this chair. The parts of the chair are designated on the blank with the same numerals given to like parts in Fig. 20. This blank is provided with four cut-outs 60, 61, 62, and 63 in addition to the cut-out or notch 52.

It will be understood that by a very slight modification of the blanks or sheets all of the chairs can be made with return bend edges as has been described specifically in respect to the chair of Fig. 4.

What we claim is:

A chair comprising a flat substantially rectangular blank of continuous malleable material, said blank having a slot extending adjacent, parallel and in spaced relation to each longitudinal edge of said blank, one end of each of said slots being spaced a substantial distance from one end of said blank, and a transverse slot adjacent the other end of said blank which joins one adjacent end of each of said longitudinal slots, whereby a tongue is formed by said slots centrally of said blank, the tongue adapted to be bent along a transverse line intermediate the ends to form a substantially horizontal seat portion and a substantially vertical back portion, a strip formed between each of said longitudinal slots and the adjacent edges of the blank, each of said strips being adapted to be bent outwardly from the blank and also at an intermediate point to form an arm rest, each of said arm rests having its forward portion extending below the seat, a transverse member connecting said forward portions of said arm rests and the front edge of said seat portion adapted to rest upon said transverse portion and means in the nature of legs supporting said chair.

EDWARD B. VANDAS.
EDWARD M. FISCHER.

References Cited in the file of this patent

UNITED STATES PATENTS

| Number | Name | Date |
|---|---|---|
| 251,903 | Lewis | Jan. 3, 1882 |
| 1,580,522 | Murray | Apr. 13, 1926 |
| 1,720,876 | Anderson | July 16, 1929 |
| 1,854,663 | Nebel | Apr. 19, 1932 |
| 2,215,540 | Breuer | Sept. 24, 1940 |
| 2,244,912 | Kollander | June 10, 1941 |
| 2,325,270 | Oermann | July 27, 1943 |
| 2,395,468 | Eames | Feb. 26, 1946 |
| 2,439,690 | Lippenberger | Apr. 13, 1948 |
| 2,466,912 | Rice | Apr. 12, 1949 |
| 2,480,805 | Buckels | Aug. 30, 1949 |

FOREIGN PATENTS

| Number | Country | Date |
|---|---|---|
| 582,740 | Great Britain | Nov. 26, 1946 |